(12) United States Patent
Schoenek et al.

(10) Patent No.: US 7,350,439 B2
(45) Date of Patent: Apr. 1, 2008

(54) TRANSMISSION CASE COVER WITH RADIAL INFLOW CHANNEL

(75) Inventors: Norman Schoenek, Novi, MI (US); Charles Harsch, Belleville, MI (US)

(73) Assignee: General Motors Corporation, Detroit, MI (US)

( * ) Notice: Subject to any disclaimer, the term of this patent is extended or adjusted under 35 U.S.C. 154(b) by 708 days.

(21) Appl. No.: 10/833,343

(22) Filed: Apr. 27, 2004

(65) Prior Publication Data

US 2005/0239592 A1    Oct. 27, 2005

(51) Int. Cl.
*F16H 57/04* (2006.01)
(52) U.S. Cl. ................................ 74/606 R
(58) Field of Classification Search ............ 474/43, 474/144, 146; 74/606 R; 184/11.5
See application file for complete search history.

(56) References Cited

U.S. PATENT DOCUMENTS

| | | | |
|---|---|---|---|
| 2,502,564 A * | 4/1950 | Hansson | 74/16 |
| 4,539,866 A | 9/1985 | Koivunen | 475/210 |
| 5,605,513 A * | 2/1997 | Van Der Hardt Aberson | 474/43 |
| 6,267,700 B1 * | 7/2001 | Takayama | 474/93 |
| 6,287,227 B1 | 9/2001 | Vahabzadeh et al. | 474/28 |
| 6,338,688 B1 * | 1/2002 | Minami et al. | 474/144 |
| 6,398,683 B1 * | 6/2002 | Fukuda | 474/144 |

* cited by examiner

*Primary Examiner*—Vicky A. Johnson

(57) ABSTRACT

A case cover assembly to which a sheave for a continuously variable transmission is mountable for rotation about an axis is configured to provide fluid communication between the sheave and a pressurized fluid source. The case cover assembly includes a conduit defining a first segment of a passageway for providing fluid communication between the pressurized fluid source and the sheave. An inner annular surface and an outer annular surface define an annular second segment of the passageway. A chamber at least partially formed by a case cover member defines a third segment of the passageway. The third segment is positioned with respect to the second segment such that fluid flows radially inward toward the axis from the second segment. The radial inflow provides improved pressure transference and packaging compared to the prior art.

12 Claims, 3 Drawing Sheets

TRANSMISSION CASE COVER WITH RADIAL INFLOW CHANNEL

TECHNICAL FIELD

This invention relates to case covers for continuously variable transmissions that are configured to convey hydraulic fluid from a pressurized fluid source to a sheave, and to minimize pressure losses by employing radial inflow channeling.

BACKGROUND OF THE INVENTION

Continuously variable transmissions (CVT) of the variable pulley or sheave type include an input sheave assembly and an output sheave assembly operatively interconnected by a flexible transmitter, such as a belt or chain. Each of the sheave assemblies has a piston in fluid communication with a pressurized fluid source, and is configured such that the distance from the sheave assembly's axis of rotation to where the flexible transmitter engages the sheave assembly is responsive to fluid pressure acting on the piston. Thus, the transmission ratio is varied by selectively changing the fluid pressure acting on each sheave assembly's piston.

Each sheave assembly is rotatable about an axis; thus, fluid is supplied to each sheave assembly axially, i.e., along the sheave assembly's axis of rotation, from a fluid passageway connected to the pressurized fluid source. It is desirable to minimize the dimensions of a transmission to provide increased packaging space or interior space in a vehicle. Decreasing the angle between the passageway and the axis may result in reduced transmission dimensions, but may also result in a loss of fluid pressure and accompanying inefficiencies.

SUMMARY OF THE INVENTION

A continuously variable transmission case cover assembly to which at least one adjustable sheave assembly is rotatably mountable for rotation about an axis is provided. The case cover assembly includes a conduit partially defining a passageway for providing fluid communication between a pressurized fluid source and the sheave assembly. The case cover assembly also includes an inner annular surface and an outer annular surface spaced a distance apart from one another and defining an annular portion of the passageway therebetween. The annular portion of the passageway is positioned with respect to the conduit such that at least a portion of fluid from the conduit flows circumferentially along the inner annular surface. The case cover assembly also includes a member that at least partially forms a chamber. The chamber further defines the passageway by interconnecting the annular portion of the passageway to the axis so that fluid from the annular portion of the passageway flows radially inward toward the axis in the chamber.

The case cover assembly of the invention results in radial inflow of the fluid, which enables compact transmission packaging with improved pressure transference compared to prior art systems. In a preferred embodiment, the case cover assembly includes an insert that forms the inner annular surface, partially defines the chamber, and defines a segment of the passageway oriented along the axis for connection to the sheave assembly. The insert is preferably press fit into a concavity in the case cover member to form the annular portion of the passageway and the chamber. The press fit enables an assembler to check for leaks prior to full system assembly and provides retention of the insert to the housing under pressure. The case cover is preferably configured such that an end bearing of the sheave retains the insert in place through physical part interference to provide further retention capability.

The above features and advantages, and other features and advantages, of the present invention are readily apparent from the following detailed description of the best mode for carrying out the invention when taken in connection with the accompanying drawings.

DESCRIPTION OF THE PREFERRED EMBODIMENT

Figure 1:
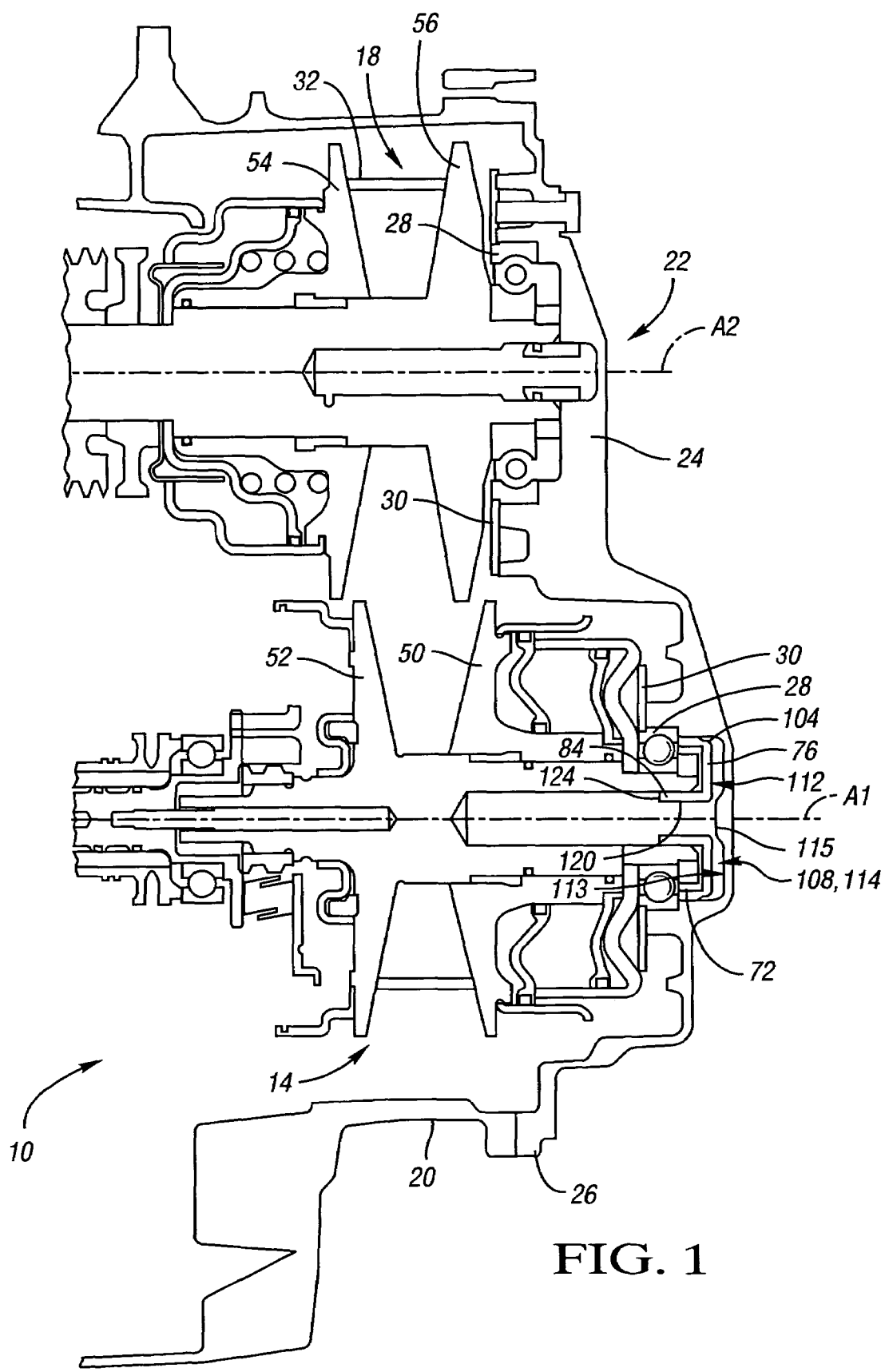
FIG. 1 is a schematic cross-sectional view of a continuously variable transmission including a drive sheave assembly, driven sheave assembly, case, and case cover assembly.

Referring to FIG. 1, a continuously variable transmission (CVT) 10 includes a drive sheave assembly 14 and a driven sheave assembly 18 at least partially contained in a transmission case 20. A case cover assembly 22 includes a case cover member 24 with an attachment flange 26 at which the case cover member 24 is affixed to the case 20 to close and seal the case.

The sheave assemblies 14, 18 each include a bearing 28 and a bearing retainer 30 at which the sheave assemblies 14, 18 are rotatably mounted to the case cover member 24. Drive sheave assembly 14 is rotatable about axis A1. Driven sheave assembly is rotatable about axis A2. The drive sheave assembly 14 is driven by an engine crankshaft (not shown) via a transmission input shaft and clutch or torque converter. The driven sheave assembly 18 is drivingly connected with vehicle drive wheels (not shown). The drive sheave assembly 14 and the driven sheave assembly 18 are interconnected by a flexible transmitter such as a belt 32.

Figure 2:
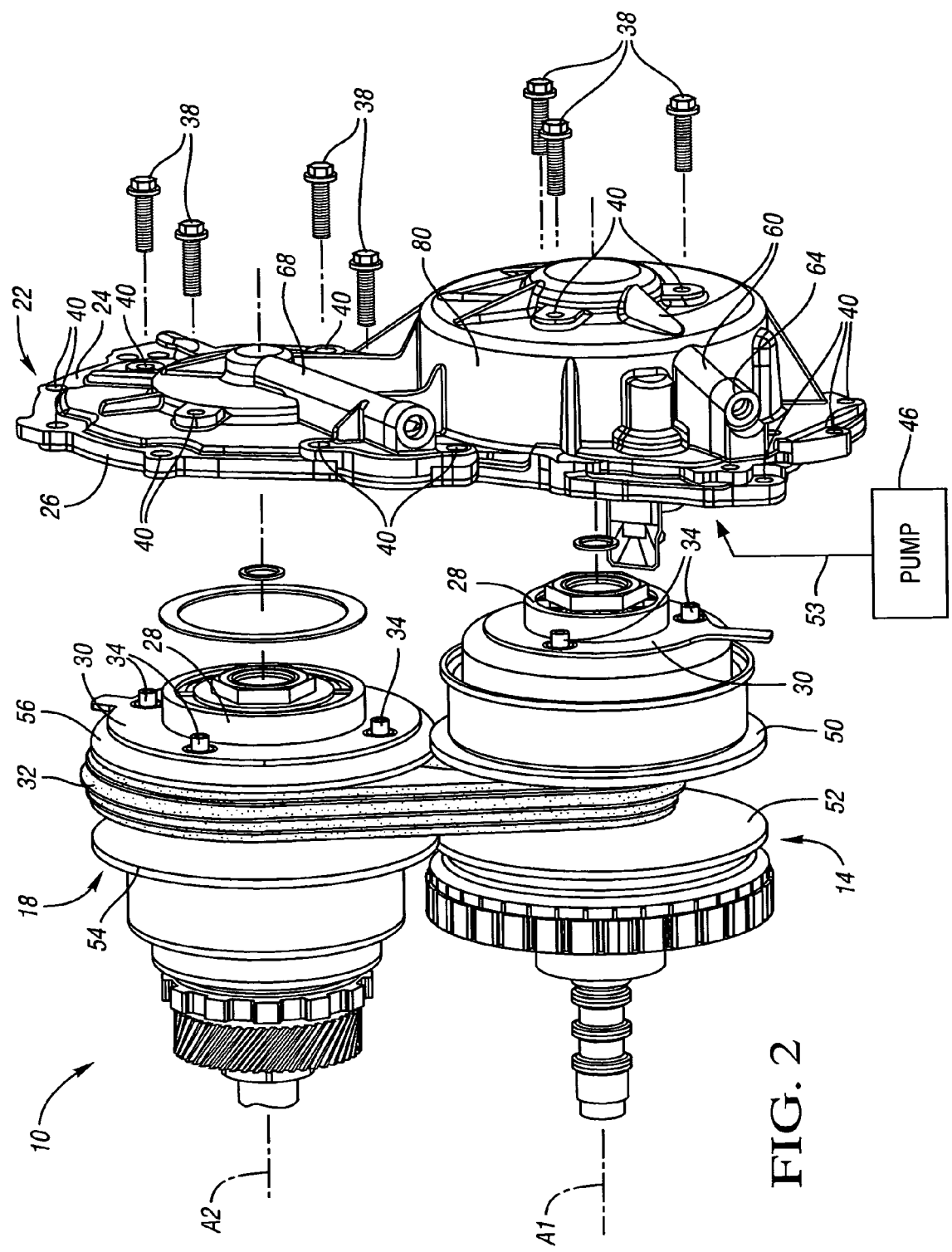
FIG. 2 is a schematic, partially-exploded perspective view of the drive sheave assembly, driven sheave assembly, and case cover assembly of FIG. 1.

Referring to FIG. 2, wherein like reference numbers refer to like components from FIG. 1, the bearing retainers 30 include integral nuts 34 that are engageable with threaded fasteners 38 through holes 40 to fasten the bearing retainers 30 to the case cover member 24. The bearing retainers 30 are configured to retain the bearings 28 between the bearing retainers 30 and the case cover member 24 by physical part interference. Alignment of nuts 34 and holes 40 is achieved during transmission assembly by an alignment system described in a commonly assigned, concurrently filed United States patent application having attorney docket number GP-304191 and entitled "Continuously Variable Transmission Case Cover," which is hereby incorporated by reference in its entirety. The attachment flange 26 has holes 40 therein through which threaded fasteners (not shown) are used to affix the case cover assembly 22 to the case.

The drive sheave assembly 14 is adjustable so that the distance from axis A1 to where the flexible transmitter 32 engages the drive sheave assembly 14 is selectively adjustable. More specifically, the drive sheave assembly 14 is in fluid communication with a pressurized fluid source such as pump 46. The drive sheave assembly 14 includes a first portion 50 and a second portion 52. The first portion 50 is axially movable with respect to the second portion 52 in response to pressurized fluid 53 to thereby alter the distance from the axis A1 to where the flexible transmitter 32 engages the drive sheave assembly 14.

In a similar manner, the driven sheave assembly 18 is in fluid communication with the pressurized fluid source 46. A first portion 54 of the driven sheave assembly 18 is axially movable with respect to a second portion 56 of the driven sheave assembly 18 in response to pressurized fluid 53. Exemplary CVTs with adjustable pulleys are described in U.S. Pat. No. 4,539,866, issued Sep. 10, 1985 to Koivunen, and U.S. Pat. No. 6,287,227, issued Sep. 11, 2001 to Vahabzadeh et al, both of which are hereby incorporated by reference in their entireties.

The pump 46 is connected to a conduit (not shown) that is formed in the transmission case (shown at 20 in FIG. 1) and that conveys fluid 53 from the pump 46 to a port at the interface between the case and the case cover member 24. The case cover assembly 22 includes a conduit 60 formed in the cover member 24. The conduit 60 includes an inlet (not shown) near flange 26. The inlet is operatively connected to the port in the transmission case. The conduit 60 forms a first segment (shown at 66 in FIGS. 3 and 4) of a passageway between the inlet and the drive sheave assembly 14 to provide fluid communication between the pump 46 and the sheave assembly 46. The case cover member 24 is drilled to form a portion of the conduit 60 that is generally perpendicular to axis A1. Drill hole 64 is plugged after the drilling operation. The remainder of the conduit, i.e., from the inlet to the portion that is generally perpendicular to axis A1, may be an as-cast feature of the case cover member 24. The case cover member also defines a conduit 68 for supplying pressurized fluid to the driven sheave assembly 18.

Figure 3:
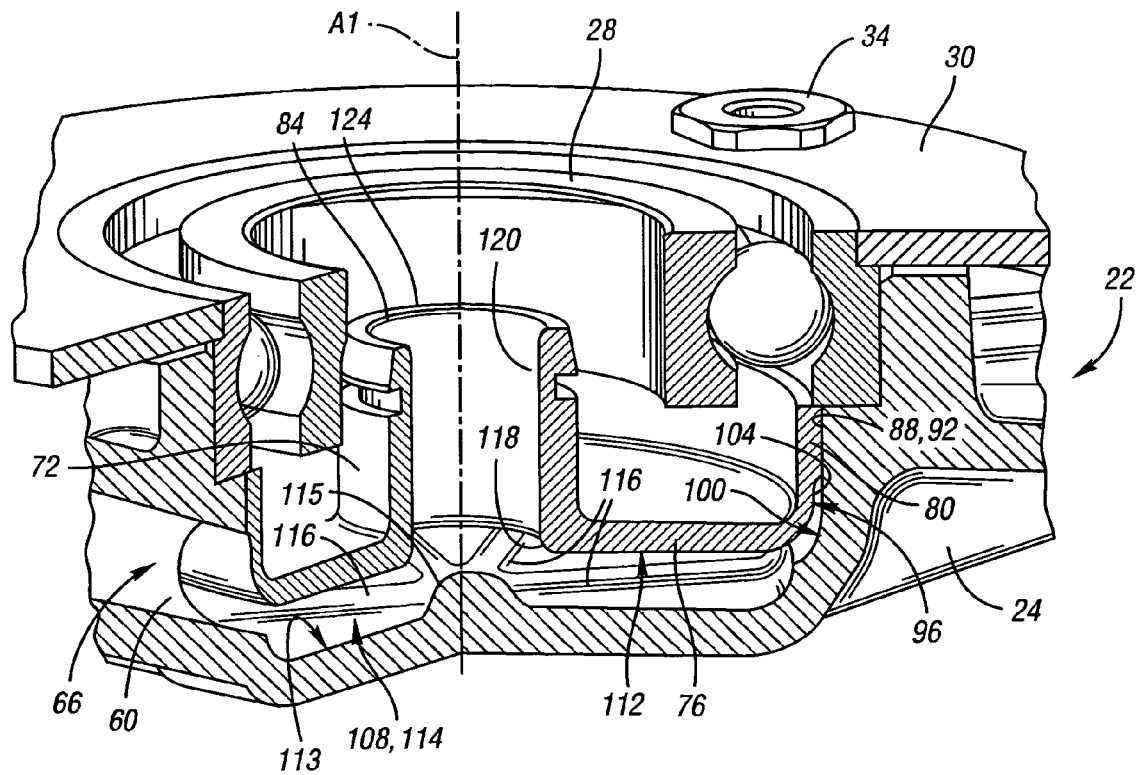
FIG. 3 is a schematic, partial cutaway perspective view depicting an insert in the case cover assembly that partially defines a passageway though which the drive sheave assembly is in fluid communication with a pressurized fluid source.

Referring to FIG. 3, wherein like reference numbers refer to like components from FIGS. 1 and 2, the case cover assembly 22 includes an insert 72 characterized by a disk portion 76, a circumferential wall 80, and a cylindrical, tubular portion 84. The insert 72 is press-fit into a concavity or socket 88 in the case cover member 24 such that a portion of the circumferential wall 80 bears against a wall 92 of the socket 88. A portion of the insert 72 forms an inner annular surface 96 spaced a distance apart from an outer annular surface 100 formed on the case cover member 24. The inner annular surface and the outer annular surface define an annular second segment 104 of the passageway therebetween.

A chamber 108 is defined between a surface 112 of the disk portion and surface 113 of the case cover member 24. The chamber 108 defines a third segment 114 of the passageway. Surface 113 is characterized by a protuberance 115 at axis A1 and raised feed ribs 116 radiating from the protuberance 115 to encourage radial flow in the third segment 114 of the passageway. The tubular portion 84 extends along the axis of rotation A1 from a hole 118 formed in the disk portion 76. The cylindrical tubular portion 84 defines an axial fourth segment 120 of the passageway that extends from the hole 118 in the disk portion 76 to the distal end 124 of the tubular portion 84.

Figure 4:
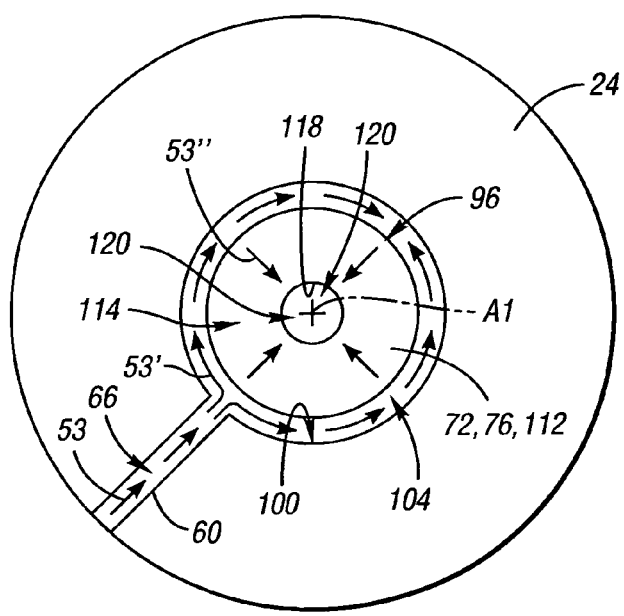
FIG. 4 is a schematic sectional view of the case cover assembly, illustrating fluid flow through the passageway.

Referring to FIG. 4, wherein like reference numbers refer to like components from FIGS. 1-3, the first segment 66 formed by the conduit 60 is positioned with respect to the annular second segment 104 such that a portion of fluid 53' conveyed by the conduit 60 is diverted by the inner annular surface 96 and flows circumferentially along the inner annular surface 96 in the second segment 104 of the passageway. The chamber, i.e., the third segment 114, interconnects the second segment 104 to the fourth segment 120 such that fluid 53" from the second segment 104 flows radially inward from the third segment 114 toward the axis A1 and then flows axially through the tubular portion and the axial fourth segment 120 of the passageway and into the drive sheave assembly.

Referring again to FIG. 1, the bearing retainer 30 of the drive sheave assembly 14 fastens the bearing 28 to the case cover member 24 by part interference, and the bearing 28 further retains the insert 72 in place by physical part interference.

While the best mode for carrying out the invention has been described in detail, those familiar with the art to which this invention relates will recognize various alternative designs and embodiments for practicing the invention within the scope of the appended claims.

The invention claimed is:

1. A case cover assembly to which a sheave assembly of a continuously variable transmission is mountable for rotation about an axis, the case cover assembly comprising:
   a conduit defining a first segment of a passageway for providing fluid communication between a pressurized fluid source and the sheave assembly;
   an inner annular surface and an outer annular surface spaced a distance apart from one another, defining an annular second segment of the passageway therebetween, and sufficiently positioned with respect to the conduit such that at least a portion of fluid conveyed through the first segment flows circumferentially along the inner annular surface in the second segment; and
   a case cover member at least partially forming a chamber that defines a third segment of the passageway; wherein the third segment is sufficiently positioned with respect to the second segment such that fluid from the second segment flows radially inward toward the axis in the third segment.

2. The case cover assembly of claim 1, further comprising a tubular portion defining a fourth segment of the passageway oriented along the axis and connected to the third segment.

3. The case cover assembly of claim 2, wherein the case cover member defines a concavity that partially forms the chamber, and wherein the case cover assembly further comprises an insert defining the inner annular surface and the tubular portion, and having a disk portion that partially defines the chamber and across which fluid flows radially inward in the third segment.

4. The case cover assembly of claim 3, wherein the insert is press fit into the concavity.

5. The case cover assembly of claim 1, further comprising a plurality of raised ribs in the chamber radiating from the axis.

6. A continuously variable transmission for a vehicle, the continuously variable transmission comprising:
   a sheave assembly rotatable about an axis;
   a pressurized fluid source;
   a conduit defining a first segment of a passageway through which the sheave is in fluid communication with the pressurized fluid source;
   an inner annular surface and an outer annular surface spaced a distance apart from one another, defining an annular second segment of the passageway therebetween, and sufficiently positioned with respect to the conduit such that at least a portion of fluid conveyed through the first segment flows circumferentially along the inner annular surface in the second segment; and a case cover member at least partially forming a chamber that defines a third segment of the passageway;

wherein the third segment is sufficiently positioned with respect to the second segment such that fluid from the second segment flows radially inward toward the axis in the third segment.

7. The continuously variable transmission of claim 6, further comprising a tubular portion defining a fourth segment of the passageway oriented along the axis and interconnected with the third segment.

8. The continuously variable transmission of claim 7, wherein the sheave assembly is connected to the tubular portion and in fluid communication with the fourth segment.

9. The continuously variable transmission of claim 6, wherein the continuously variable transmission further includes an insert defining the inner annular surface and the tubular portion, and having a disk portion that partially defines the chamber and across which fluid flows radially inward in the third segment.

10. The continuously variable transmission of claim 9, wherein the insert is retained between the sheave and the cover member by physical part interference.

11. The continuously variable transmission of claim 6, wherein the annular second segment of the passageway circumscribes the axis.

12. A case cover assembly to which a sheave assembly of a continuously variable transmission is mountable for rotation about an axis, the case cover assembly comprising:

a conduit defining a first segment of a passageway for providing fluid communication between a pressurized fluid source and the sheave assembly;

a case cover member defining a concavity with a first annular surface; and an insert having a disk portion, a second annular surface, and a tubular portion;

wherein the insert and the case cover member define an annular second segment of the passageway between the first annular surface and the second annular surface; wherein the disk portion and the case cover member define a chamber therebetween forming a third portion of the passageway; and wherein the third segment is sufficiently positioned with respect to the second segment such that fluid from the second segment flows radially inward toward the axis in the third segment.

* * * * *